United States Patent
Lin et al.

(10) Patent No.: US 12,323,327 B2
(45) Date of Patent: *Jun. 3, 2025

(54) EVPN HOST ROUTED BRIDGING (HRB) AND EVPN CLOUD NATIVE DATA CENTER

(71) Applicant: Juniper Networks, Inc., Sunnyvale, CA (US)

(72) Inventors: Wen Lin, Andover, MA (US); Manish Gupta, San Jose, CA (US); Shivakumar Channalli, Sunnyvale, CA (US); Vinay K Nallamothu, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,600

(22) Filed: Dec. 13, 2023

(65) Prior Publication Data

US 2024/0113969 A1 Apr. 4, 2024

Related U.S. Application Data

(63) Continuation of application No. 17/452,309, filed on Oct. 26, 2021, now Pat. No. 11,902,160.
(Continued)

(51) Int. Cl.
*H04L 45/745* (2022.01)
*H04L 12/46* (2006.01)
*H04L 49/25* (2022.01)

(52) U.S. Cl.
CPC ........ *H04L 45/745* (2013.01); *H04L 12/4633* (2013.01); *H04L 12/4641* (2013.01); *H04L 49/25* (2013.01)

(58) Field of Classification Search
CPC ............. H04L 12/4633; H04L 12/4641; H04L 45/745; H04L 49/00; H04L 49/25
See application file for complete search history.

(56) References Cited

U.S. PATENT DOCUMENTS

| 10,200,274 B1 * | 2/2019 | Suryanarayana ....... H04L 45/02 |
| 10,263,832 B1 * | 4/2019 | Ghosh ................. H04L 43/0823 |
(Continued)

FOREIGN PATENT DOCUMENTS

| CN | 103259735 A | 8/2013 |
| CN | 110875844 A | 3/2020 |
| WO | 2020152691 A1 | 7/2020 |

OTHER PUBLICATIONS

Anonymous et al., "Understanding EVPN with VXLAN Data Plane Encapsulation", The Wayback Machine, May 2021, 10 pp., Retrieved from the Internet on Jan. 24, 2023 from URL: https://web.archive.org/web/20210512144749/https://www.juniper.net/documentation/us/en/software/junos/evpn-vxlan/topics/concept/evpn-vxlan-date-plane-encapsulation.html.
(Continued)

*Primary Examiner* — Wutchung Chu
(74) *Attorney, Agent, or Firm* — Shumaker & Sieffert, P.A.

(57) ABSTRACT

Techniques for EVPN Host Routed Bridging (HRB) and EVPN cloud-native data center with Host Routed Bridging (HRB) are described. A host computing device of a data center includes one or more containerized user-level applications. A cloud native virtual router is configured for dynamic deployment by the data center application orchestration engine and operable in a user space of the host computing device. Processing circuitry is configured for execution of the containerized user-level applications and the cloud native virtual router. The cloud native virtual router comprises a containerized routing protocol process
(Continued)

configured to operate as a control plane, and a data plane for the containerized router. The data plane is configured to operate an ethernet virtual private network (EVPN) encapsulation/decapsulation data path of an overlay network for communicating layer two (L2) network traffic of the containerized user applications over a switch fabric of the data center.

14 Claims, 5 Drawing Sheets

Related U.S. Application Data

(60) Provisional application No. 63/261,941, filed on Sep. 30, 2021.

(56) References Cited

U.S. PATENT DOCUMENTS

| | | | |
|---|---|---|---|
| 10,382,329 B1* | 8/2019 | Thomas | H04L 61/103 |
| 11,310,155 B1* | 4/2022 | Qian | H04L 45/123 |
| 11,902,160 B2 | 2/2024 | Lin et al. | |
| 2011/0134931 A1* | 6/2011 | Merwe | H04L 41/0843 |
| | | | 370/401 |
| 2013/0182605 A1* | 7/2013 | So | H04W 40/00 |
| | | | 370/254 |
| 2017/0366605 A1* | 12/2017 | Chang | H04L 49/70 |
| 2020/0007405 A1* | 1/2020 | Chitalia | G06F 9/5077 |
| 2020/0028787 A1* | 1/2020 | Mehra | H04L 47/30 |
| 2020/0073692 A1* | 3/2020 | Rao | H04L 41/22 |
| 2020/0076685 A1* | 3/2020 | Vaidya | G06F 9/44526 |
| 2020/0322268 A1* | 10/2020 | Thoria | H04L 45/507 |
| 2021/0234898 A1* | 7/2021 | Desai | H04L 63/104 |
| 2022/0027208 A1* | 1/2022 | Kong | G06F 9/455 |
| 2022/0060405 A1* | 2/2022 | Shimizu | H04L 45/7453 |
| 2022/0109693 A1* | 4/2022 | Mashargah | H04L 41/0869 |
| 2022/0279420 A1 | 9/2022 | Akkipeddi et al. | |
| 2022/0353177 A1* | 11/2022 | Mohammad | H04L 41/0895 |
| 2023/0155934 A1* | 5/2023 | Tracy | H04L 45/20 |
| | | | 709/238 |
| 2024/0113969 A1* | 4/2024 | Lin | H04L 49/00 |
| 2024/0193015 A1* | 6/2024 | Malhotra | H04L 12/462 |

OTHER PUBLICATIONS

Extended Search Report from counterpart European Application No. 22198857.9 dated Feb. 3, 2023, 13 pp.
Juniper Networks, "Junos Containerized Routing Protocol Daemon", Nov. 2020, 3 pp.
Prosecution History from U.S. Appl. No. 17/452,309, dated May 24, 2023 through Dec. 29, 2023, 78 pp.
Response to Extended Search Report dated Feb. 3, 2023, from counterpart European Application No. 22198857.9 filed Oct. 3, 2023, 30 pp.
Sajassi et al., "A Network Virtualization Overlay Solution Using Ethernet VPN (EVPN)," RFC 8365, Internet Engineering Task Force (IETF), Mar. 2018, 34 pp.
Sajassi et al., "BGP MPLS-Based Ethernet VPN", RFC 7432, Internet Engineering Task Force, Feb. 2015, 56 pp.
Communication pursuant to Article 94(3) EPC from counterpart European Application No. 22198857.9 dated Oct. 4, 2024, 6 pp.
Sajassi et al., "A Network Virtualization Overlay Solution Using Ethernet VPN (EVPN)", Request for Comments: 8365, Mar. 2018, 1-33 pp.
First Office Action and Search Report from counterpart Chinese Application No. 202211199137.5 dated Jan. 23, 2025, 25 pp. Translation Attached.
Response to Communication pursuant to Article 94(3) EPC dated Oct. 4, 2024, from counterpart European Application No. 22198857.9 filed Feb. 3, 2025, 16 pp.

* cited by examiner

EVPN HOST ROUTED BRIDGING (HRB) AND EVPN CLOUD NATIVE DATA CENTER

This application is a continuation of U.S. patent application Ser. No. 17/452,309, filed Oct. 26, 2021, which claims the benefit of U.S. Provisional Patent Application No. 63/261,941, filed 30 Sep. 2021, the entire contents of which is incorporated herein by reference.

TECHNICAL FIELD

The disclosure relates to Ethernet virtual private networks (EVPNs) overlay networks within data centers.

BACKGROUND

A data center is a collection of interconnected computer servers and associated components, housed in one or more facilities. In a typical data center, a large collection of interconnected servers provides computing and/or storage capacity for execution of various applications. For example, a data center may comprise a facility that hosts applications and services for subscribers, i.e., customers of the data center. The data center may, for example, host all of the infrastructure equipment, such as networking and storage systems, redundant power supplies, and environmental controls. In most data centers, clusters of storage systems and application servers are interconnected via a high-speed switch fabric provided by one or more tiers of physical network switches and routers. More sophisticated data centers provide infrastructure spread throughout the world with subscriber support equipment located in various physical hosting facilities. Data centers are often made up of a large number of devices, including both servers and devices that form an Internet Protocol (IP) fabric. The IP fabric may be represented as an underlay network having leaf and spine network switching devices.

One form of modern datacenters is an "Ethernet Virtual Private Network" (EVPN) or EVPN-VXLAN data center in which layer two (L2) connectivity is extended as a network overlay over the physical network fabric of the data center. The EVPN data center is widely used in industry and has emerged as a popular networking framework largely due to the limitations of traditional VLAN-based networks. However, the EVPN data center presents certain technical challenges and limitations. For example, an EVPN data center is based on a monolithic network design architecture with a tightly coupled software and hardware model. As such, it can be technically difficult to expand the data center to accommodate increasing demands of traffic growth in the data center and to scale horizontally because the infrastructure of a typical EVPN data center network is often designed, physically deployed and pre-provisioned for the peak capacity required for the applications and services of the data center.

SUMMARY

In general, this disclosure describes new architectures and technical solutions for EVPN data centers, referred to herein as EVPN Host Routed Bridging (HRB) and EVPN cloud-native data centers with Host Routed Bridging (HRB). As described, the technical solutions enable scalability for EVPN data centers while using consistent operational models. That is, the techniques provide solutions that allow data center infrastructure to meet changes in network demand that, for example, may be application-driven with dynamic and varying traffic flow requirements. Moreover, the solutions may advantageously decouple software and underlying hardware infrastructure, thereby allowing for quick delivery and scalability of EVPN services.

In a conventional EVPN data center, traffic from host servers is communicated via L2 or L3 EVPN using VLAN tags on the access and VXLAN Network Identifier (VNI) in the core between the leaves or between the leaves and spines, often according to an overlay network set up via a control plane or routing protocol, such as BGP. Each leaf switch of the switch fabric operates as a tunnel endpoint for the overlay network of the switch fabric and encapsulate and decapsulate L2 packets. That is, each leaf of the switch fabric performs L2 bridging for L2VLAN-tagged packets or performs both L2 bridging and L3 routing functions and tunnels those packets across the switch fabric of the data center.

As further described herein, this disclosure describes technical solutions that enable EVPN bridging between L2 and L3 connectivity, such as the functions and operations described in RFC 7432 and RFC 8365, directly on the host servers of the data center, i.e., the same customer end-point servers that may be hosting customer applications, services and/or data. Such architecture and functionality is referred to generally herein as "EVPN host-routed bridging" (HRB), and data centers configured as described herein may be referred to as an "EVPN cloud native" (EVPN CN) data center. Technical solutions are also described to enable auto-provisioning EVPN HRB to provide connectivity for containerized, dynamically deployed user-level applications within a data center based on data specifying a user intent through, in some examples, a Container Network Interface (CNI) software interface, which may be a plug-in software module readily invokable via a network orchestrator (e.g., a Kubernetes container orchestrator) for the data center, thus directly exposing as controllable the new host-routing bridging architectures described herein to high-level, application orchestration components of the data center.

In one example, this disclosure describes a host computing device of a data center. The computing device includes one or more containerized user-level applications configured for dynamic deployment by a data center orchestration engine; a cloud native virtual router configured for dynamic deployment by the data center application orchestration engine and operable in a user space of the host computing device; and processing circuitry configured for execution of the containerized user-level applications and the cloud native virtual router; The cloud native virtual router comprises a containerized routing protocol process configured to operate as a control plane for the containerized router, and a data plane for the containerized router, wherein the data plane is configured to operate an ethernet virtual private network (EVPN) encapsulation/decapsulation data path of an overlay network for communicating layer two (L2) network traffic of the containerized user applications over a switch fabric of the data center. The containerized routing protocol process of the cloud native virtual router is configured as one or more containers for dynamic deployment by the data center orchestration engine.

In another example, this disclosure describes a data center network system comprising a plurality of host computing devices interconnected by a switch fabric. Each of the host computing devices includes a cloud native virtual router having a containerized routing protocol process configured to operate as a control plane for the cloud native virtual router, and a data plane. The data plane of the cloud native virtual router provides a set of layer two (L2) bridging domains connected to a layer three (L3) virtual routing and forwarding (VRF) data structure for an ethernet virtual private network (EVPN) overlay network for communicating layer two (L2) network traffic between the containerized user applications via the switch fabric of the data center.

In another example, this disclosure describes a method that includes receiving, with a containerized virtual network router, data specifying a high-level intent for the EVPN encapsulation/decapsulation data path for a containerized user application for deployment on the host computing device by the data center orchestration engine. The method includes translating the data specifying the intent into configuration data for the data path of the containerized virtual network router, and dynamically setting up the EVPN data path of the containerized virtual network router to provide a network connection between the containerized user application being deployed and a desired bridge domain of the EVPN data path.

In another example, this disclosure describes a computer-readable medium having instructions to cause programmable processing circuitry to receive, with a containerized virtual network router, data specifying a high-level intent for the EVPN encapsulation/decapsulation data path for a containerized user application for deployment on the host computing device by the data center orchestration engine. The instructions further cause the programmable processing circuitry to translate the data specifying the intent into configuration data for the data path of the containerized virtual network router, and dynamically set up the EVPN data path of the containerized virtual network router to provide a network connection between the containerized user application being deployed and a desired bridge domain within the containerized virtual network for the EVPN data path.

The details of one or more examples are set forth in the accompanying drawings and the description below. Other features, objects, and advantages will be apparent from the description, drawings, and claims.

DETAILED DESCRIPTION

Figure 1:
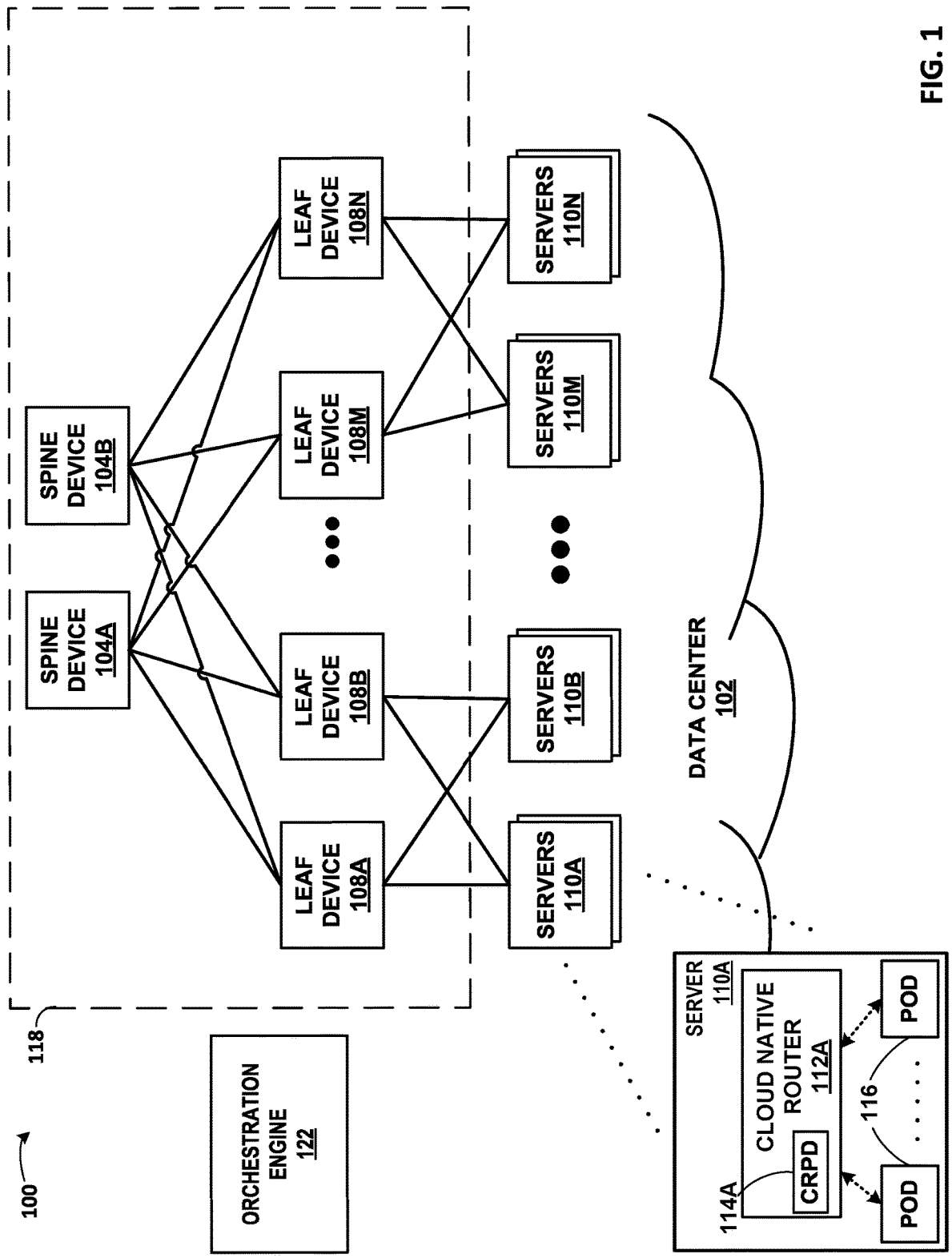
FIG. 1 is a block diagram illustrating examples of EVPN Host Routed Bridging (HRB) and EVPN cloud-native data center with Host Routed Bridging (HRB) as examples of the techniques described.

FIG. 1 is a block diagram illustrating an example network in which an EVPN data center is configured according to architectures and technical solutions described herein, referred to herein as EVPN Host Routed Bridging (HRB) and EVPN cloud-native data center with Host Routed Bridging (HRB).

FIG. 1 illustrates an example network 100 including a data center 102 connected to customer devices 120. Data center 102 may, for example, host infrastructure equipment, such as networking and storage systems, redundant power supplies, and environmental controls. In general, data center 102 provides an operating environment for applications and services for customer devices 120 coupled to the data center, e.g., by a service provider network (not shown). In some examples, data center 102 represents one of many geographically distributed network data centers. As illustrated in the example of FIG. 1, data center 102 may be a facility that provides network services to customers through customer devices applications executing as virtualized elements (shown as pods 116) on host servers 110.

In the example of FIG. 1, data center 102 hosts customer application pods 116 providing services for enterprises and end users. Other example customer applications may include data storage, virtual private networks, traffic engineering, file service, data mining, scientific- or super-computing, and so on. In some examples, data center 102 may be individual network servers, network peers, or otherwise. In some examples, data center 102 is an enterprise or internal/private data center.

As shown in the example of FIG. 1, data center 102 include one or more interconnected servers 110A-110N (collectively, "servers 110") that each provides execution and storage environments for applications and data associated with customers via customer devices 120 and may be physical servers, virtual machines, or combinations thereof. Servers 110 are interconnected via an IP fabric 118 (also referred to as a switch fabric), which may comprise a fabric provided by one or more tiers of physical network devices, such as, for example, routers, gateways, switches, hubs, modems, bridges, repeaters, multiplexers, servers, virtual machines running on one or more of the same, and other example network devices.

In general, network traffic within IP fabric 118, such as packet flows between servers 110, may traverse the physical network of IP fabric 118 using many different physical paths. For example, a "packet flow" can be defined by values used in a header of a packet, such as the network "five-tuple," i.e., a source IP address, destination IP address, source port and destination port that are used to route packets through the physical network, and a communication protocol. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Geneve label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

IP fabric 118 may provide servers 110 with redundant (multi-homed) connectivity to the IP fabric and service provider network. In this example, IP fabric 118 represents layer two (L2) and layer three (L3) switching and routing components that provide point-to-point connectivity between servers 110. In one example, IP fabric 118 comprises a set of interconnected, packet-based routers and switches that implement various protocols. In one example, IP fabric 118 may comprise devices that provide IP point-to-point connectivity. In some multi-staged networks such as IP fabric 118, each switch resides in a defined layer of the network, referred to as a CLOS topology or a spine and leaf network. As shown in the example of FIG. 1, spine network devices 104A and 104B (collectively, "spine network devices 104") reside in a first, top layer and leaf network devices 108A-108N (collectively, "leaf network devices 108") reside in a second layer. As further described herein, cloud native routers 112 executing on servers 110 are configured as host routed bridging (HRB_functionality such that leaf network devices 108 need only provide layer 3 (e.g., IP) routing functionality with respect to an EVPN overlay network extending between servers 110. Spine network devices 104 aggregate traffic flows and provides high-speed connectivity between leaf network devices 108. Spine network devices 104 are coupled to IP fabric 118 may operate as a layer 3 gateway device. Spine network devices 104 and leaf network devices 108 may each include one or more processors and a memory, and that are capable of executing one or more software processes. As shown in the example of FIG. 1, each of spine network devices 104 is communicatively coupled to each of leaf network devices 108A-108N. The configuration of network 100 illustrated in FIG. 1 is merely an example. For example, data center 102 may include any number of spine and leaf network devices.

Unlike conventional EVPN data centers, spine network devices 104 and leaf network devices 108 need not participate in an L2 virtual private network ("L2VPN") service, such as Ethernet Virtual Private Network (EVPN) instance (EVI). As further explained, according to the techniques described herein, cloud native routers 112 on servers 110 can be enabled with HRB functionality via orchestration engine 122 such that spine network devices 104 and leaf network devices 108 need only provide IP connectivity for the underlay switch fabric 118 over which the EVPN overlay operates, thereby providing a much more scalable solution than previous EVPN data center implementations. In general, an EVPN is a service that provides a form of L2 connectivity across an intermediate L3 network to interconnect two or more L2 networks that may be located in different racks of data center 102. Often, EVPN is transparent to the customer networks in that these customer networks are not aware of the intervening intermediate network and instead act and operate as if these customer networks were directly connected and form a single L2 network. In a way, EVPN enables a form of transparent local area network ("LAN") connection between two customer networks (e.g., different racks of data center 102) that each operates an L2 network and may also be referred to as a "transparent LAN service."

System 100 provides an EVPN that is extended over switch fabric 118 by one or more network virtualization overlays to provide Layer-2 connectivity across switch fabric 118 operating as an underlaying Layer-3 network. In some examples, system 100 uses the EVPN to provide a Layer-2 and Layer-3 control plane. Each of network virtualization overlays operates to virtually isolate groups of spine network devices 104, leaf network devices 108, and/or servers 110. For convenience, network virtualization overlays are described herein as being implemented by VXLANs to provide tunneling for the overlay virtual network. VXLAN provides a data encapsulation protocol to carry Layer-2 traffic across a Layer-3 network. In alternative examples, network virtualization overlays may use VLAN, Network Virtualization using Generic Route Encapsulation (NVGRE), Stateless Transport Tunneling (STT), Geneve, or other virtual network tunneling protocol.

In a conventional EVPN data center, traffic from host servers is communicated via L2 EVPNs using VLAN tags and packet forwarding between leaves network devices 108 and spines network devices 104 via L3 routing, often according to an overlay network defined within IP forwarding tables set up via a control protocol or routing protocol, such as BGP. Each leaf switch of the switch fabric operates as a tunnel endpoint for the overlay network of the switch fabric and encapsulate and decapsulate L2 packets. That is, each physical leaf switch of the switch fabric of a conventional data center performs L2 bridging for L2VLAN-tagged packets and also performs L3 routing functions to tunnel the packet across the switch fabric of the data center.

As further described herein, this disclosure describes technical solutions that enable EVPN bridging between L2 and L3 connectivity, such as the functions and operations described in RFC 7432 and RFC 8365, directly on the host servers 110 of the data center 102, i.e., the same customer end-point servers that may be hosting customer applications, services and/or data. Such architecture and functionality is referred to generally herein as "EVPN host-routed bridging" (HRB), and data centers configured as described herein may be referred to as an "EVPN cloud native" (EVPN CN) data center. Technical solutions are also described to enable auto-provisioning EVPN HRB within a data center based on data specifying a user intent through, in some examples, a Container Network Interface (CNI) software interface, which may be a plug-in software module readily invokable via a network orchestrator (e.g., a Kubernetes container orchestrator) for the data center, thus directly exposing as controllable the new host-routing bridging architectures described herein to high-level, application orchestration components of the data center. Further example details of EVPNs are described in RFC 7432, *BGP MPLS-Based Ethernet VPN*, Internet Engineering Task Force (IETF) (February 2015), and RFC 8365, *A Network Virtualization Overlay Solution Using Ethernet VPN (EVPN)*, IETF (March 2018), the contents of both being incorporated herein by reference.

In the example of FIG. 1, each of servers 110 provides computational execution environments for virtualized workloads for customers, shown as pods 116. Each of servers 110 may be a real or virtual server that hosts/executes software that customer workloads. Such software may include one or more applications deployed as, e.g., virtual machine or containers, to servers 110. In general, pods 116 are typically each associated with a customer and configured to communicate with other pods for the same customer or network partition using assigned virtual local area networks (VLANs), where L2 traffic for each VLAN is switched to other pods and/or routed through the overlay network extending across IP fabric 118.

Further, according to the techniques described herein, each of servers 110, executes a cloud-native router 112 (e.g., cloud native router 112A of server 110A) having a containerized routing protocol daemon (cRPD) so as to provide the VPN host-routed bridging functions described herein. Router 112A may be referred to herein as "cloud native" in that the router is fully containerized (i.e., dynamically deployable as a container for execution by host servers 110, such as within a POD) and thus may be managed via higher-level data center virtualization orchestration systems, such as orchestration engine 122, as if the router were a high-level user application.

For example, as configured according to the techniques described herein, deployments and configuration of cloud-native virtual routers 112 on servers 110 for providing EVPN connectivity and bridging services across switch fabric 118 may be fully manageable via orchestration engine 122, which is typically solely used for managing higher-level, application-layer functions of data center 10, such as managing compute, storage, networking, and application resources executing on servers 110. In other words, orchestration engine 122 represents an application-level container orchestration platform for orchestrating deployment of containerized customer applications on servers 110. "Orchestration," in the context of virtualized computing infrastructure described herein, generally refers to provisioning, scheduling, and managing virtual execution elements and/or applications and services executing on such virtual execution elements to the host servers 110 available to the orchestration platform. Container orchestration, specifically, permits container coordination and refers to the deployment, management, scaling, and configuration, e.g., of containers to host servers 110 by a container orchestration platform. Example instances of orchestration platforms include Kubernetes, Docker swarm, Mesos/Marathon, OpenShift, OpenStack, VMware, and Amazon ECS. As such, orchestration engine 122 controls the deployment, scaling, and operations of containers across clusters of servers 110 and the providing of computing infrastructure, which may include container-centric computing infrastructure. As an example, Kubernetes is a container management platform that provides portability across public and private clouds, each of which may provide virtualization infrastructure to the container management platform.

In regard to the example of FIG. 1, orchestration engine 122 orchestrates pods 116 and containerized, micro-service-based elements of cloud native routers 112 on each of servers 110, including at least cRPDs 114. In some examples, an underlying data plane of cRPDs 114 is also containerized and orchestrated by orchestration engine 122. The data plane may, in some examples, be a DPDK-based virtual router, for instance.

Containers, including those implementing containerized routing protocol daemons 114, may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily virtual execution element hosting devices of a cluster. For example, the Kubernetes platform uses the terms "cluster master" and "minion nodes," while the Docker Swarm platform refers to cluster managers and cluster nodes. Servers 110 or virtual machines thereon may represent cluster nodes.

As such, the techniques described herein enable cloud native routers 112 to be fully managed as scalable virtualized elements within data center 102. Virtualization within a data center, such as data center 102, or any environment that includes one or more servers can provide several technical advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operation system-level virtualization. Containers are lightweight and portable execution elements for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

Orchestration engine 122 may execute on separate computing devices or execute on the same computing device. Further, orchestration engine 122 may be a distributed application that executes on one or more computing devices. Orchestration engine 122 may implement respective master nodes for one or more clusters each having one or more minion nodes implemented by respective servers 110. Although not shown, an SDN controller may be used to control the network configuration and to distribute routing and configuration information to the control plane elements of cloud native routers 112. Alternatively, cloud native routers may include all necessary functionality for sharing routes and implementing the EVPN across IP fabric 118, e.g., via a master router reflector, thereby avoiding the use of an SDN controller and instead providing control and configuration of network 100 in response to high-level direction from orchestration engine 122.

In this way, the techniques enable technical solutions unlike conventional computing infrastructure where deployment and infrastructure for application execution may involve two distinct roles: (1) orchestration—for automating deployment, scaling, and operations of high-level customer applications across clusters of hosts and providing computing infrastructure for executing those applications, which may include container-centric computing infrastructure; and (2) low-level network connectivity management—for creating virtual networks in the network infrastructure to enable packetized communication among applications running on virtual execution environments, such as containers or VMs, as well as among applications running on legacy (e.g., physical) environments. Software-defined networking controllers or other forms of network-level controllers or management systems are typically used for low-level network connectivity management.

Although low-level controllers may still be used, this disclosure describes techniques for a cloud native orchestration framework for EVPN host-routed bridging services operable on host servers 110 and dynamically manageable via orchestration engine 122, thus providing highly-scalable, cloud-native solutions that can be managed by high-level orchestration engine 122. The techniques may involve, in at least some aspects, deploying cloud native routers 112 to servers 110 (hosts) as a logically-related group of one or more containers ("pod") that supports the EVPN HRB components for performing bridging and routing services for the EVPN, thereby extending the overlay tunnels of the switch fabric overlay network of IP fabric 118 into the servers for termination by cRPDs 114.

In some examples, each of containerized routing protocol daemons (cRPDs) 114 is a routing protocol process or execution thread(s) that is packaged as a container to run in containerized Linux-based environments. In one example, cRPD runs as a docker container inside a Pod, which is the smallest virtualization unit in a Kubernetes-based orchestration system. Kubernetes uses IP-per-Pod model, but conventionally does not orchestrate setting up the network infrastructure or networks services, with such functionality falling to an SDN controller or other lower-level network controller. In contrast, cloud-native cRPDs 114 make available the rich routing software pedigree of physical routers on Linux-based compute nodes in a manner that is fully manageable via orchestration engine 122. For example, cRPD 114 provides L2/L3 control plane functionality for network connectivity within data center 102, and may execute on a Linux kernel as a docker inside a Kubernetes Pod. Thus, the control plane of cRPD 114 may itself be containerized within the virtualized environment managed by orchestration engine 122.

In various aspects of this disclosure, each of cloud native routers 112 deployed and operable on servers 110 comprises a set of software components that provide CNI functionality configured to address networking requirements unique to cloud data center network environments. As described above, the software components may include, for example, a containerized routing protocol daemon (cRPD) 114 to support reachability to a hosted Pod to, e.g., advertise over protocols such as BGP, set up tunnels dynamically using various technologies such as MPLS, SRv6, VxLAN/GRE, IPsec, etc. The software components of cloud native routers 112 use cRPD to distribute Layer 3 (L3) network reachability information of the Pods executing on host servers 112. The cRPD may also program a data plane within cloud native router 112 on each compute node (host) 110.

In some examples, cloud native routers 112 include one or more Container Network Interface (CNI) plug-in(s) software elements. That is, in some examples, cloud native routers 112 includes one or more container networking interface plugins (CNIs). Each CNI may be viewed as defining a networking solution for application containers and providing a runtime executable that assists with configuring interfaces between containers and other components of the computing device ("host") hosting the container. When invoked by orchestration engine 122, a CNI typically assigns the network address (e.g., IP address) to the network interface and may also add routes relevant for the interface, such as routes for the default gateway and one or more nameservers.

In some examples for EVPN HRB described herein, each of servers 110 is configured with two different types of container networking plugins (CNIs). For example, as further described below in reference to FIG. 2, a server 110 may be configured with a hierarchy of CNIs in which a CNI "meta-plugin" is functionally able to invoke other CNIs. In this way, multiple orchestration CNIs can be used with different executional code including, as described herein, a primary CNI and a secondary CNI.

As further discussed herein, the primary CNI provides a runtime executable that establishes a network communication interface for orchestration engine 122 to communicate with orchestration agent 210 and similar agents on other servers 110. Thus, primary CNI provides a run time executable for dynamically establishing network interfaces for pods 116, including pod-to-pod "default" networking between different hosts 112. For example, orchestration engine 122 may use the primary CNI to sett up a vhost control channel and assigning IP (e.g., both IPv4 and IPv6) and MAC addresses, advertising the Pod IP addresses, and detecting and withdrawing the routes when the Pod is considered down or removed. The primary CNI is typically capable of providing basic CNI functionality such as assigning IP addresses, setting up of interfaces between the pod and host and route setup.

According to the techniques described herein, a secondary CNI may be configured and deployed as part of a software package with cloud native virtual routers 112 and provides a second runtime executable that may be invoked by orchestration engine 122 to establish additional network interfaces and forwarding constructs for pods 116 to establish EVPN connectivity, including HRB EVPN functionality within cloud native router 112. For example, the secondary CNI is configured to construct and attaching a network interface a pod 116 as well as hosted EVPN forwarding constructs within cloud-native router 112, all on demand when an application pod 116 is spawned. For example, secondary CNI may automatically and dynamically provision the network interface and forwarding constructs for providing EVPN connectivity to a deployed pod 116 based on a predefined network attachment object (profile). In this way, from the networking perspective, when a user application pod 116 is created by orchestration engine 122, the secondary CNI may dynamically set up all necessary virtual network interfaces between the application pods 116 and a corresponding bridge domain under an EVPN MAC-VRF (see FIG. 2) within the appropriate cloud-native virtual router 112. As such, a user application pod 116 is able to operate as a virtual customer edge "CE" device to the bridge domain provided by cRPD 114 and cloud native router 112 operating on the same host server as the user application pod. The secondary CNI uses cRPD 112 for its advanced routing features: managing the IP address and network reachability, updating the routing table, and bringing up VXLAN tunnel for the EVPN to provide L2 bridging and overlay connectivity between hosts 110 across switch fabric 118. For overlay VXLAN tunnels across different hosts 110, the tunnel end points may use each server 110 loopback address when cRPD is brought in host mode on each node.

In this way, the techniques described herein provide an EVPN Cloud Native Data Center with Host Routed Bridging (HRB) built upon the container-based application that utilizes cRPD, CNI plug-ins and container orchestration technology (e.g., Kubernetes) with cloud native approaches which can be used by any cloud provider. The EVPN cloud native HRB takes full advantage of the cloud computing model to build an advanced DC solution that integrates physical IP fabric with a virtualized EVPN overlay network that is provided directly on hosts 110 into a unified data center fabric. In addition, based on solution proposed in this document, EVPN cloud native data center with HRB can provide auto-provisioning of EVPN running on the host based on user intent.

EVPN Cloud native data center 102 with HRB provided by cloud native routers 112 enables containers and Kubernetes orchestration platform to provide a common operational model and provides application portability across different environments and infrastructure including public, private or hybrid data centers. HRB may, for example, use the Kubernetes orchestration platform for running and managing cRPD in a clustered computing environment. EVPN cloud native data center 102 with HRB is aligned with how higher-level applications are built, deployed, and managed, and reduces the complexity and operational cost using a consistent cloud infrastructure (e.g., switch fabric 118). For example, the solutions and systems described herein enabled data centers, configured according to the techniques herein, to:

- spin up a consistent environment quickly on demand without obstacles and delays associated with the provisioning infrastructure,
- provide a scale out solution on demand as containerized applications can scale horizontally by simply adding more application instances through increasing the number of worker nodes and containers in K8s,
- offer self-service and life-cycle management capabilities across the data center, and
- auto-provision EVPN HRB on demand based on data describing high-level user intent CNI plug-in(s).

Figure 2:
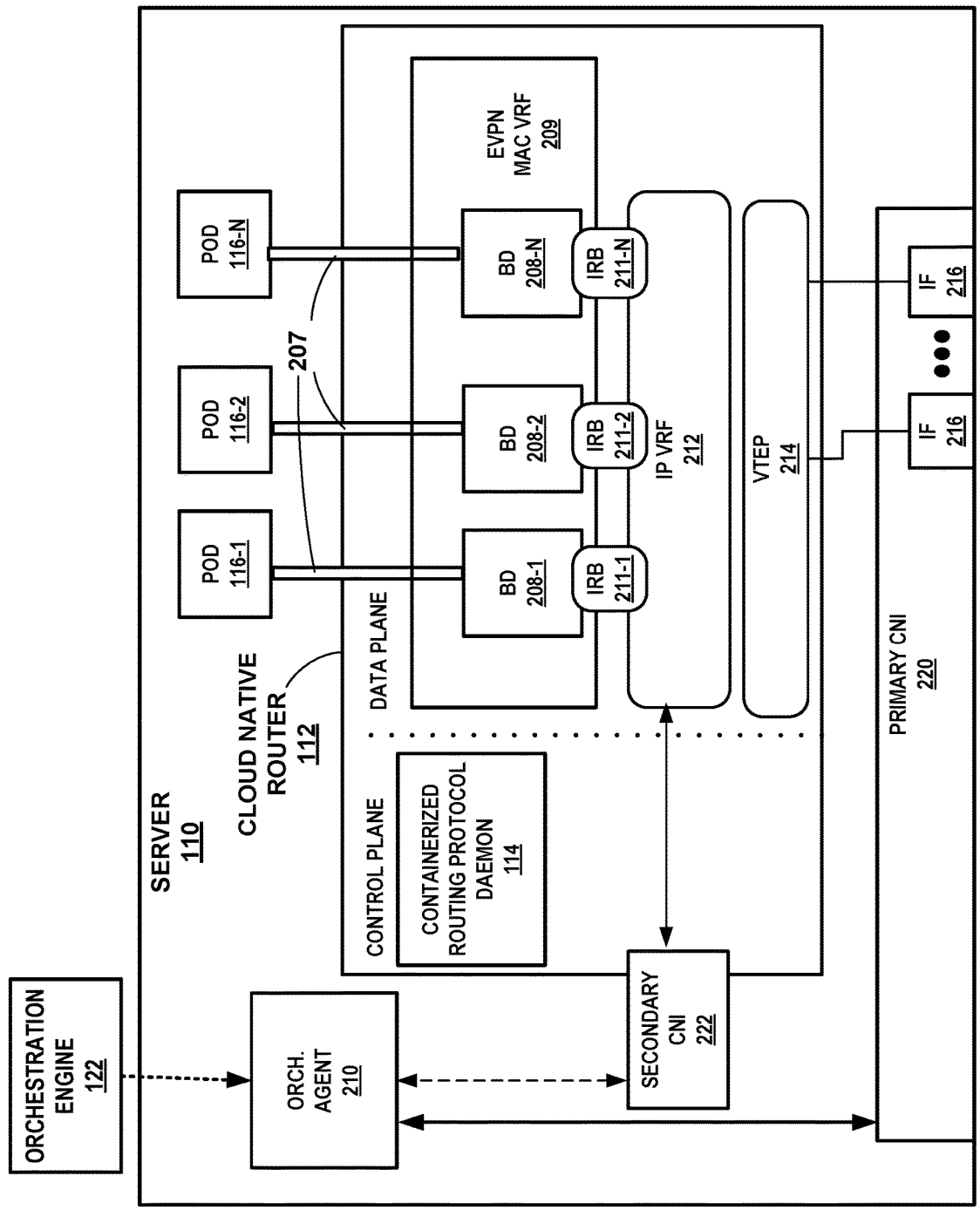
FIG. 2 is a block diagram illustrating an example implementation of the data center of FIG. 1 in further detail, in accordance with techniques described in this disclosure.

FIG. 2 is a block diagram providing further details of an example implementation of server 110 configured for cloud-native EVPN Host Routed Bridging (HRB) services.

As shown in this example, server 110 includes cloud native router 112 that operates as a virtualized element under the control of orchestration engine 122 via orchestration agent 210. As such, cloud native router 112 is controlled via orchestration engine 122 and orchestration agent 210 in the same matter that the orchestration engine and agent 210 control (i.e., dynamically deploy) user application pods, such as pods 1161 to 116-N.

Orchestration agent 210 includes code executable by an underlying microprocessor of server 110, and may be one or more computer processes. Orchestration agent 210 may, for example, represent a kubelet for a minion node of a Kubernetes cluster. Moreover, orchestration agent 210 is an agent of an orchestrator, e.g., orchestration engine 122 of FIG. 1, that receives container specification data for containers of pods 116 and ensures the containers execute by processors of servers 110. Container specification data may be in the form of a manifest file sent to orchestration agent 210 from orchestration engine 122 or indirectly received via a command line interface, HTTP endpoint, or HTTP server. Container specification data may be a pod specification (e.g., a PodSpec—a YAML (Yet Another Markup Language) or JSON object that describes a pod). Based on the container specification data, orchestration agent 210 directs a container engine (not shown) to obtain and instantiate the container images for containers, for execution of containers by server 110A.

As shown, FIG. 2 illustrates an example data plane for containerized, cloud-native router 112. In this example, each application pod 116A-1 to 116A-N includes logical network interfaces 207 providing layer two (L2) communication connectivity to respective L2 bridging domains ("BDs") 208-1 through 208-N provided by the data plane for handling L2 customer communications in isolation according to a L2 EVPN MAC virtual routing and forwarding data structure 209 storing, for example, L2 MAC addresses and L2 reachability information for the EVPN. Within the data plane provided by cloud-native router 112, each BD 208 of MAC VRF 209 provides a virtual L2 forwarding environment, and is coupled to a corresponding Integrated Routing and Bridging (IRB) interface 211 that provides bridging services for communicating L2 traffic of BDs 208 via a layer three (L3) virtual routing and forwarding (VRF) structure 212. That is, in some examples, the data plane of cloud native router 112 is configured to provide the integrated routing and bridging (IRB) functionality that may be necessary for extending EVPN overlay networks from the data center IP switch fabric all the way to hosted endpoints on servers 110. VXLAN Tunnel End Point (VTEP) 214 of the data plane of cloud native router 112 provides the VXLAN encapsulation/decapsulation endpoint for communication via physical network interfaces 216 and tunneling traffic through the VXLAN overlay network spanning IP fabric 118 of data center 102.

In general, orchestration agent 210 instantiates secondary CNI 222 as a run time executable architected to configure the necessary virtual network interfaces 209 pods 116 on demand (i.e., when deployed) and to connect the virtual network interfaces 209 to the correct L2 bridge domains 208 based on high-level intent definitions provided by way of orchestration engine 122.

In the example of FIG. 2, cloud native routers 112 is packaged with multiple container networking plugins (CNIs) to execute instructions to establish the multiple, network interfaces to be attached to a pod of cloud native router 112 for managing both underlay connectivity to the IP fabric as well as overlay connectivity to user application pods 116 on host 110. As shown, cloud native router 112 includes primary CNI 220 and secondary CNI 222 that, as described above, enable orchestration engine 122 to attach multiple network interfaces to pod-constructed cloud native router 112. Primary CNI 220 executes instructions to establish network connectivity for orchestration engine 122 to communicate with orchestration agent 210 and for pod-to-pod "default" networking between orchestration agents of different hosts 112. Control plane communications of cRPD 112 provide advanced routing features: managing the IP address and network reachability, updating the routing table, and configuring VTEP 214 to establish VXLAN tunnels for the EVPN to provide L2 bridging and overlay connectivity between hosts 110 across switch fabric 118.

Unlike traditional EVPN data centers built with centrally routed bridging (CRB) or edge routed bridging (ERB) switch fabrics where bridging and routing takes place on the physical leaf and/or spine nodes for EVPN, cloud native router 112 and cRPD 114 provide bridging and routing on host server 110. As such, feature supportability and interoperability for EVPN overlay network rely need not rely heavily on different types of hardware platforms and network switches deployed within the data center switch fabric. With Host Routed Bridging, bridging and routing take place on the hosts and the EVPN overlay virtual network starts and ends on the host itself. In some examples, cRPD 114 with EVPN HRB runs as a docker container on host 110 to perform both underlay and EVPN overlay network function based on the standard. cRPD 114 may run as a standalone software application in user space on Linux-based platforms, and may be packaged as a docker container and built to run natively on Linux: physical, virtual and/or cloud. As such, cRPD can enable technical solutions that scale with much less cost and with quick turnaround development and testing time.

For underlay reachability, cRPD 114 provides routing functions such as BGP, ISIS, OSPF, and other protocols, and establishes the network reachability between the hosts through the IP fabric. As such, the IP fabric may consists of leaf and spine CLOS network that serve as pure transport for connecting different hosts. With the techniques described herein, only hosts 110 need serve as the Network Overlay Endpoints (NVEs) for the EVPN spanning switch fabric 118. With VXLAN encapsulation via VTEP 214, the VXLAN tunnel established by EVPN overlay through cRPD terminates directly at the hosts. Forwarding can use Linux kernel as the data plane where cRPD 114 is responsible for programming the Linux FIB through the netlink channel, or may use a Data Plane Development Kit (DPDK) data plane to support fast path packet communication on a data channel between a virtual router and the pod, or even a SmartNiC for performance gain. Further example details of various data planes that may be used with cloud native router 112 are described in U.S. Provisional Patent Application 63/242,434, entitled "CONTAINERIZED ROUTER WITH VIRTUAL NETWORKING", filed Sep. 9, 2021, incorporated herein by reference.

In other examples, secondary CNI 222 may be configured to arrange different types of hosted EVPN forwarding constructions within cloud native router 112. For example, secondary CNI 222 may execute instructions to establish Type 5 EVPN forwarding constructs on demand. In this case, one or more of pods 116 may be configured with a network interface connecting to IP VRF 212 for L3 forwarding through a n EVPN overlay without requiring dynamic connection to a bridge domain 208 and a MAC VRF 209.

Figure 3:
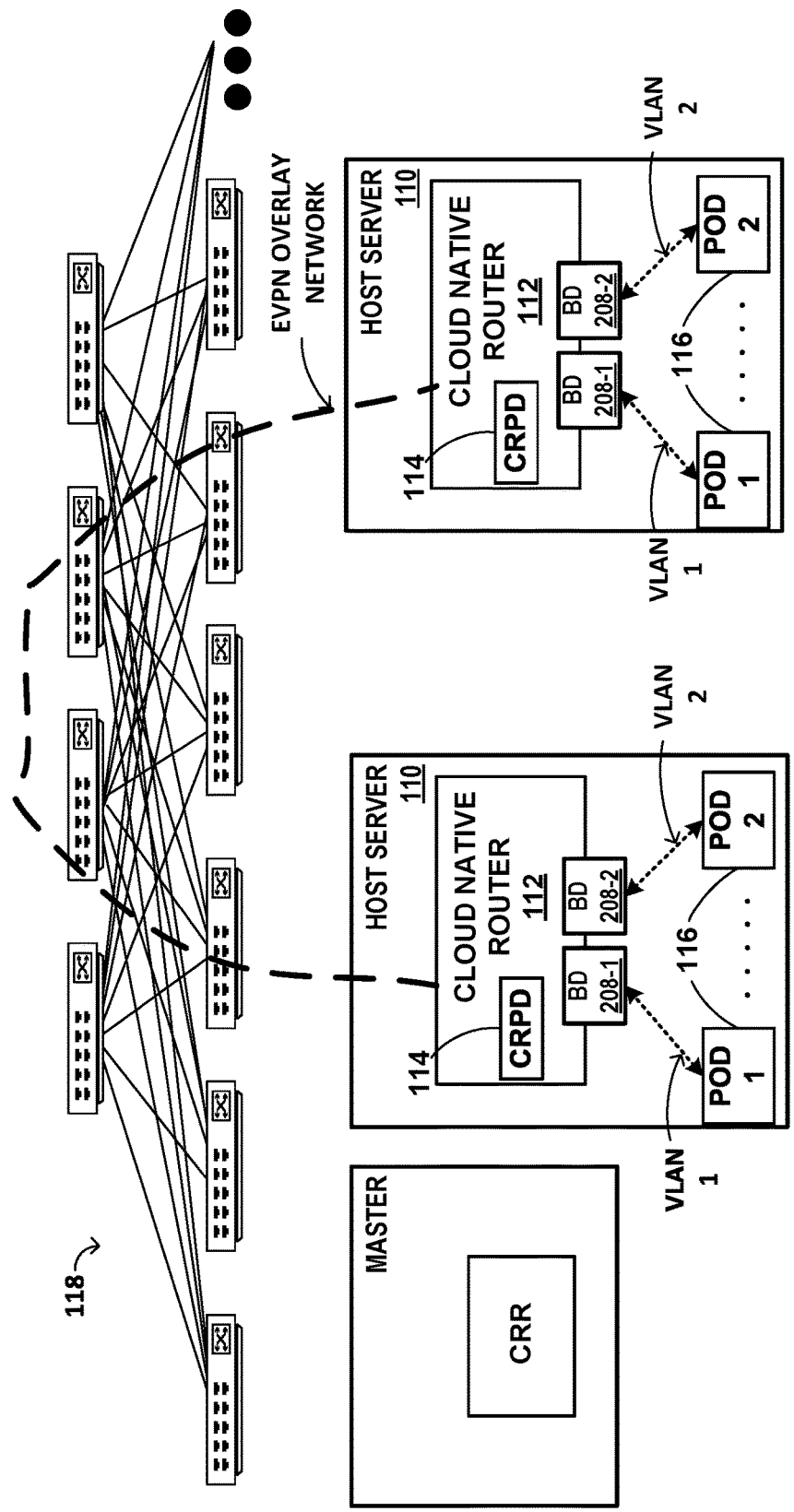
FIG. 3 is a block diagram providing another view of data center and the interconnectivity enabled by the EVPN Host Routed Bridging (HRB) described herein.

FIG. 3 is a block diagram providing another view of data center 102 and the interconnectivity enabled by the EVPN Host Routed Bridging (HRB) described herein, which provides both EVPN layer 2 bridging and layer 3 routing functions directly from the hosts 110, VM or server based on the procedures defined in RFC 7432 and RFC 8365. In some examples, EVPN Host routed bridging is realized through a standalone software application for routing protocol stack, disaggregated from the hardware and build to run natively on Linux platform, e.g., cloud native router 112. As described, cloud native router 112, is the containerized RPD (cRPD) which operates as a routing protocol stack decoupled from any underlying operating system or hardware platform. In various examples, cRPD 112 is extended as described herein to support EVPN HRB to integrate with the Linux network stack and provides EVPN overlay function directly on a host (e.g., a virtualized host, VM or physical server).

In the example of FIG. 3, one or more of servers 110 operates as a master node having a containerized route reflector (cRR), also controllable via orchestration engine 122. In this example, master node (server 0) provides an operating environment for the containerized route reflector by which cRPDs 114 of cloud-native routers exchange routing information. Each host 110 may, for example, participate in IGP protocol of the underlay network provided by the switch fabric to learn reachability to other BGP peers and route reflector(s). IS-IS may also be used as an interior gateway protocol to advertise host/node addresses to the network.

With respect to EVPN overlay functionality, EVPN host routed bridging can provide a rich set of EVPN features directly on hosts 110, including features set forth in EVPN standards, as shown in the following non-limiting examples:
  HRB can be configured as described herein to support multi-tenancy for EVPN,
  Interface Service Types: VLAN-based service and VLAN-aware bundle service,
  Integrated Routing and Bridging (IRB),
  Type-2 asymmetric routing,
  Type-2 symmetric routing,
  EVPN Type-5 symmetric routing,
  HRB can be extended as described herein to support data center interconnection (DCI) without L2 stretch using EVPN type-5, and
  HRB can also be extended to support seamless pod interconnection when the bridge domain is Layer 2 stretched.

The techniques described herein may provide certain technical advantages with respect to resilience and reliability.

As one example, EVPN HRB described herein may improve the resilience and reliability of the EVPN data center by eliminating potential L2 loop and broadcast storm and by simplifying EVPN bridging operation.

As another example, EVPN HRB eliminates L2 looping or broadcast storm which could be a problem caused by wrong cabling or forwarding issue if the host is multihomed to two or more physical routers when EVPN bridging takes place at the physical routers instead of the host. This is because with HRB, VM or user application Pod attached to the EVPN bridge domain created by cRPD is also running on the same host. The architecture eliminates the possibility of physical link failure between "PE" (cRPD in this case) and "CE" (pod in this case) that hosts the service application. In HRB, VM or user application Pod running on the same host is single-homed to cRPD with no need for complex link failure protection. Load balance for the east-west traffic across different hosts is achieved through the underlay ECMP.

As yet another example, EVPN HRB simplifies EVPN bridge operation as there is no need for multihoming Ethernet segment split-horizon rule, no need for electing a designated forwarder either. As a result, HRB eliminates various race conditions that could be potentially introduced otherwise among different peer multihomed PEs.

As an additional technical improvement, EVPN HRB described herein provides load balance and optimal bridging and routing on the host. EVPN HRB supports host multi-homing to the leaf devices and it allows a host to connect to multiple leaf switches depending on the number of physical ports that a host has.

When a packet is tunneled through the VXLAN between two hosts, the transit leaf or spine nodes in the IP Fabric only see the tunnel header, the packet is forwarded based on the outer IP header and it is load-balanced by all transit nodes based on source UDP port. The source UDP port is hashed based on the inner payload header. With host multihoming to the leaf devices, it ensures the maximum utilization of all the available network bandwidth offered by the leaf/spine IP fabric.

With EVPN HRB, traffic between application pods attached to the bridge domain(s) on the same host achieves the optimal bridging and routing. Application pods attached to the same VLAN at the same host can be directly switched at the local host without going through the leaf or IP fabric. Traffic between applications attached to different VLANs at the same host can be locally routed through IRB on the local host without going through the leaf or IP fabric.

Figure 4:
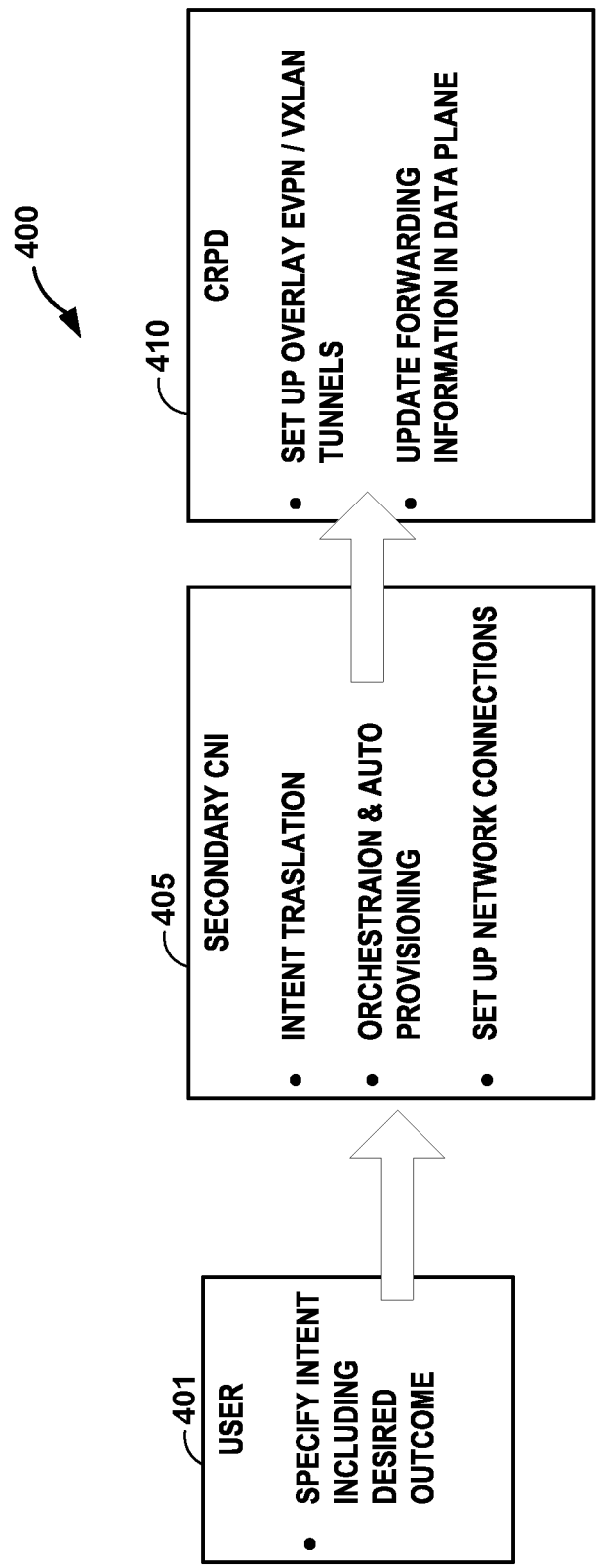
FIG. 4 is a flow diagram illustrating an example mode of operation providing a technical solution for auto provisioning EVPN HRB within a data center, on demand, based on data specifying a high-level user intent.

FIG. 4 is a flow diagram illustrating an example mode of operation providing a technical solution for auto provisioning EVPN HRB within a data center on demand, based on data specifying a user intent. In general, an EVPN cloud native data center configured with HRB as described herein is enabled to auto-provision an EVPN over the intermediate switch fabric, and dynamically attach user application Pods to desired bridge domains (BDs) based on data specifying a high-level user intent.

One example process 400 is as follow: in response to receiving data specifying what a desired intent (401), secondary CNI executes instructions to perform the following (405):

Translate the intent to a corresponding configuration for cRPD including necessary L2/L3 routing information, Auto-provision cRPD based on the translated configuration, and Dynamically sets up the data path within the containerized virtual network router including the network connection between a user application pod to its desired bridge domain.

In response, cRPD will set up the EVPN VXLAN tunnel in the overlay and provide EVPN host routed bridging directly from the host (410).

In general, the high-level user intent represents a desired network attachment for EVPN HRB specified by the user for the user application, such as the following non-limiting examples:
1) For multitenancy—names and route targets for the tenant IP-VRF and MAC-VRF a user application wants to create or join.
2) For the desired bridge domain—the bridge domain in terms of VNI to which the user application wants to attach.

As one example with respect to Kubernetes orchestration, a NetworkAttachmentDefinition (NAD) specification along with POD-specific networking requirements may be used to specify the intent for attaching a pod to its desired network. For auto provisioning of EVPN HRB as described herein, the user intent for EVPN multitenancy can be expressed in the NAD specification. Moreover, the intent may be predefined and installed within orchestration engine 122 so that the corresponding configurations for EVPN HRB can be created on demand later when a user application pod is created and referenced by the pod metadata.

For example, for EVPN multitenancy, a tenant mac-vrf "blue" may defined in a NAD specification in the following YAML snippet. As shown in this example, the NAD specification is configured to define a particular route target used by the EVPN MAC-VRF I in the cloud native router, which is a particular instance of an Ethernet EVPN. This identifies the VPN instance to the control plane.

```
. . .
spec:
    config ' {
        "cniVersion":"0.4.0",
        "name": "blue-net",
        "type": "platter",
        "args": {
            "macVrfapplyGroups":"evpn-mac-vrf",
            "mac VrfName": "blue",
            "mac VrfTarget": "11:11"
        }
    . . .
```

Moreover, pod metadata issued by orchestration engine 122 upon deploying a given pod 166 may be expressed as in the following YAML snippet. Secondary CNI translates the metadata into specific underlying requirements of the HRB forwarding constructs necessary to connect the pod to the hosted EVPN service provided by cloud native router 112.

```
apiVersion: v1
kind: Pod
metadata:
    name: ubuntu-du1
    annotations:
        k8s.v1.cni.cncf.io/networks: |
            [
                {
                    "name": "blue-net",
                    "interface":"net1",
                    "cni-args": {
                        "macVrfVxlanVNI":"600",
                        "mac":"00:11:11:11:60:00",
                        "dataplane": "linux",
                        "ipConfig":{
                            "ipv4":{
                                "address":"99.60.0.1/24",
                                "gateway":"99.60.0.254",
                                "routes":[
                                    "99.60.0.0/16"
                                ]
                            },
                            "ipv6":{
                                "address":"1234::99.60.0.1/120",
                                "gateway":"1234::99.60.0.254",
                                "routes":[
                                    "1234::99.60.0.0/112"
                                ]
                            }
                        }
                    }
                }
            ]
spec:
    affinity:
        nodeAffinity:
            requiredDuringSchedulingIgnoredDuringExecution:
                nodeSelectorTerms:
                    - matchExpressions:
                        - key: kubernetes.io/hostname
                          operator: In
                          values:
                            - worker-node-1
    containers:
        - name: ubuntu-du1
          image: crpd:latest
          imagePullPolicy: Never
          securityContext:
              privileged: false
          env:
              - name: KUBERNETES_POD_UID
                value From :
                    fieldRef:
                        fieldPath: metadata.uid
          volumeMounts :
              - name: dpdk
                mountPath: /dpdk
                subPathExpr: $(KUBERNETES_POD_UID)
    volumes:
        - name: dpdk
          hostPath:
              path: /var/run/platter/containers
```

Referring again to FIG. 2, in response to pod deployment (i.e., deployment of a new user application pod 116) by orchestration engine 122, secondary CNI 222 fetches the metadata specified by a user application pod 116 when the user-application pod is spawned. The metadata, specified in key-value pairs, is configured in this case to point to the NAD object (e.g., "blue-net" above) and the VNI for the desired bridge domain (BD 208) to which the user application pod is to be attached. Secondary CNI 222 translates data specification of the high-level user intent to lower-level configurations for EVPN host routed bridging via cloud native virtual router 112, including generating the configuration for a tenant's IP VRF 212, MAC VRF 209, bride domain 208 and IRB 211.

If the specified NAD object cannot be found, user application pod 216 may, in some examples, not be created. Otherwise, secondary CNI 222 auto-provisions the tenant MAC-VRF 209, IP-VRF 212, bridge domain 208 and IRB 211 based on user intent on demand. Secondary CNI 222 then dynamically sets up the network connections between the user application pod to its desired bridge domain, thereby auto provisioning full EVPN HRB services on demand.

In the above example pod YAML data, the name field in the metadata from orchestration engine 122 indicates the name of NAD specification the user application pod is to use, interface defines the logical interface that secondary CNI constructs to connect the new application pod to the desired bridge domain (BD), and macVrfVxlanVNI identifies for secondary CNI the particular L2 bride domain to which the application pod is to be connected. In this way, orchestration engine 122 and secondary CNI 222 operate to deploy containerized user application pods and automate the underlying provisioning of host routed bridging EVPN services within cloud-native routers 112 on host servers 110.

Figure 5:
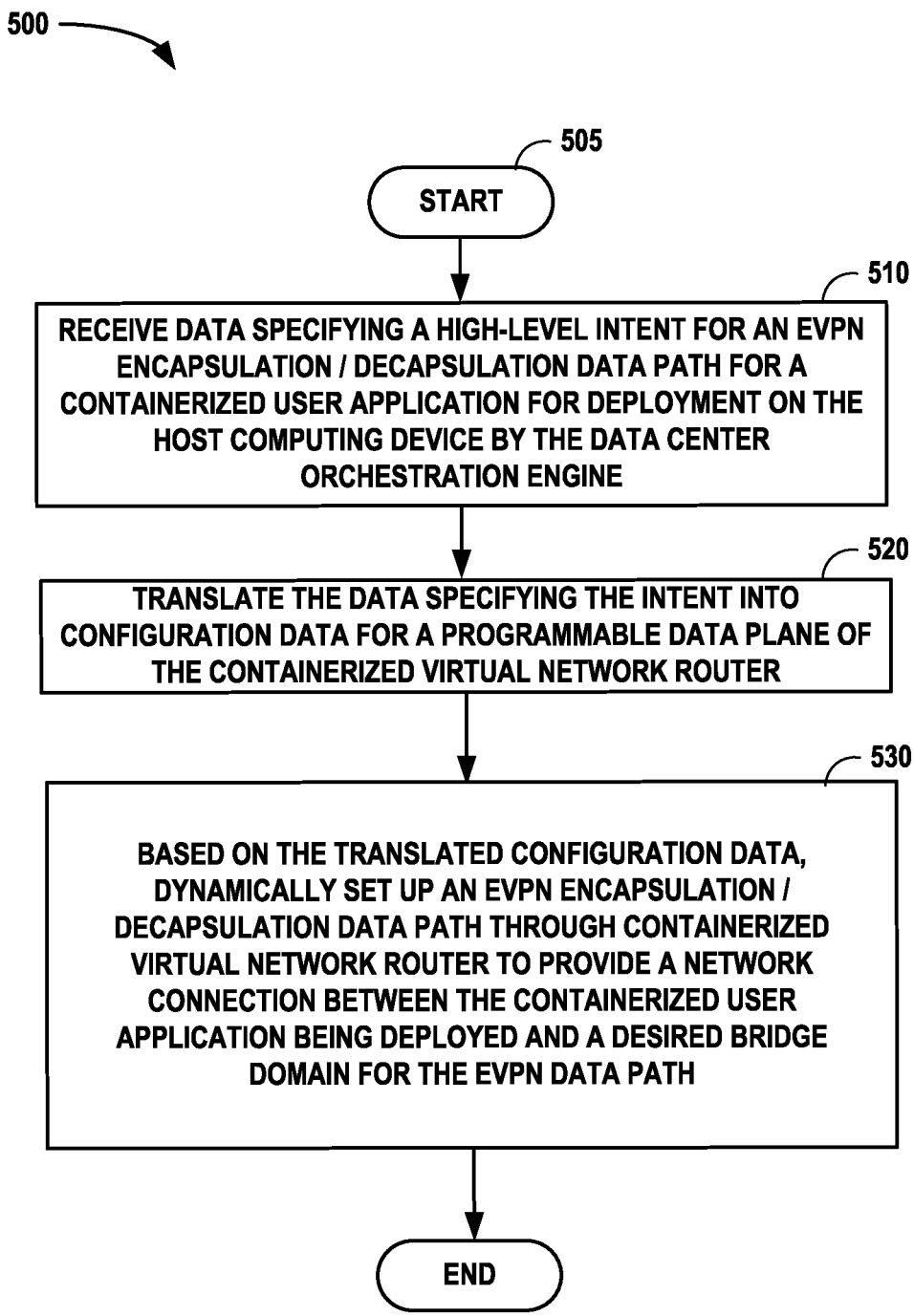
FIG. 5 is a flow diagram illustrating an example operation of a containerized virtual network router providing Host Routed Bridging (HRB) services, in accordance with one or more techniques of this disclosure.

FIG. 5 is a flowchart illustrating example operation of cloud-native router 112. In this example, a containerized virtual network router 112 receives data specifying a high-level intent for an EVPN encapsulation/decapsulation data path for a containerized user application for deployment on a host computing device by the data center orchestration engine (500). The host computing device may represent any of servers 110, for example. In response, secondary CNI 222 of cloud native router 112 translates the data specifying the intent into configuration data for a programmable data plane of the containerized virtual network router (504). Based on the translated configuration data, secondary CNI 222 dynamically sets up the EVPN encapsulation/decapsulation data path through containerized virtual network router 112 to provide a network connection between the containerized user application being deployed and a desired bridge domain 208 within the data plane of the containerized virtual network router for the encapsulation/decapsulation EVPN data path. In this process, secondary CNI may configured a network interface 207 of the deployed pod 116 and connect the network interface to the appropriate L2 bridge domain 208 based on the intent specified by orchestration engine 122, thereby providing a data path to and from an L2 bridge domain that provide bridging services as an endpoint for the EVPN data path through switch fabric 118 of data center 100 (508).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A host computing device comprising:
one or more containerized user-level applications configured for dynamic deployment by an orchestration engine;
a cloud native virtual router configured for deployment by the orchestration engine and operable in a user space of the host computing device; and
processing circuitry configured for execution of the one or more containerized user-level applications and the cloud native virtual router;
wherein the cloud native virtual router comprises:
a containerized routing protocol process configured for deployment as one or more containers and configured to operate as a control plane for the cloud native virtual router, and
a data plane for the cloud native virtual router, wherein the data plane is configured to operate an ethernet virtual private network (EVPN) encapsulation/decapsulation data path of an overlay network for communicating layer two (L2) network traffic of a containerized user-level application of the one or more containerized user-level applications, wherein the EVPN encapsulation/decapsulation data path comprises an integrated routing and bridging (IRB) interface providing bridging services for communicating the L2 network traffic of a bridge domain via a virtual routing and forwarding (VRF) structure.

2. The host computing device of claim 1, further comprising:
a first network interface attached to the cloud native virtual router,
wherein the first network interface is configured to communicate network traffic between the one or more containerized user-level applications executing on the host computing device and one or more containerized user-level applications executing on another computing device.

3. The host computing device of claim 2, further comprising:
a primary container network interface (CNI) operating as a control channel enabling the orchestration engine to manage the first network interface; and
a secondary CNI operating as a control channel enabling the orchestration engine to manage the cloud native virtual router to configure the EVPN encapsulation/decapsulation data path of the overlay network for communicating L2 network traffic of the containerized user-level application.

4. The host computing device of claim 3, wherein the secondary CNI is configured to:
receive data specifying a high-level intent for the EVPN encapsulation/decapsulation data path;
translate the data specifying the high-level intent into configuration data; and
based on the configuration data, dynamically configure the EVPN encapsulation/decapsulation data path to provide a network connection between the containerized user-level application and a desired bridge domain for the EVPN encapsulation/decapsulation data path.

5. The host computing device of claim 1, wherein the EVPN encapsulation/decapsulation data path of the cloud native virtual router is configured as a Host Routed Bridging (HRB) data path comprising:
an L2 VRF table storing media access control (MAC) addresses and L2 forwarding information for one or more L2 networks associated with the one or more containerized user-level applications executing on the host computing device; and
one or more L2 bridge domains (BDs), each of the L2 bridge domains corresponding to a different one of the L2 networks
one or more IRB interfaces that includes the IRB interface, each of the one or more IRB interfaces providing a data plane forwarding path between the layer three (L3) virtual routing and forwarding table and a different one of the one or more L2 bridge domains.

6. The host computing device of claim 1, further comprising a plurality of pods configured as virtualized elements deployable by the orchestration engine to the host computing device for execution by the processing circuitry of the host computing device,
wherein the plurality of pods comprises:
a first pod comprising the data plane for the cloud native virtual router; and
a different, second pod comprising the containerized routing protocol process.

7. The host computing device of claim 6, further comprising:
a physical network interface,
wherein the first pod is data plane development kit (DPDK)-enabled and configured that the data plane for the cloud native virtual router can exchange packets with the physical network interface using DPDK.

8. The host computing device of claim 1, wherein the containerized routing protocol process is configured to execute one or more routing protocols to exchange routing information with routers external to the host computing device.

9. The host computing device of claim 8,
wherein the containerized routing protocol process establishes routing protocol adjacencies with a plurality of containerized routers operating within other computing devices, and
wherein the plurality of containerized routers are configured for management by the orchestration engine.

10. The host computing device of claim 9,
wherein the one or more routing protocols comprise an interior gateway protocol, and
wherein the routing information comprises underlay routing information for a network, the underlay routing information obtained via the interior gateway protocol.

11. The host computing device of claim 1, wherein the containerized routing protocol process and the EVPN encapsulation/decapsulation data path are configured to provide EVPN Type-5 routing of network traffic for the one or more containerized user-level applications.

12. A system comprising:
a plurality of host computing devices;
an orchestrator configured to deploy one or more containerized user-level applications on processing circuitry of the host computing devices;
a plurality of cloud native virtual routers executing on the host computing devices,
wherein at least a containerized routing protocol process of each of the plurality of cloud native virtual routers is configured for deployment by the orchestrator as a containerized user-level application of the one or more containerized user-level applications;
wherein each of the cloud native virtual routers comprises:
the containerized routing protocol process configured to operate as a control plane for the cloud native virtual router, and
a data plane providing a set of layer two (L2) bridging domains connected to a layer three (L3) virtual routing, forwarding (VRF) data structure for an ethernet virtual private network (EVPN) overlay network for communicating layer two (L2) network traffic between the one or more containerized user-level applications, and providing integrated routing and bridging (IRB) services for communicating the L2 network traffic via the VRF structure.

13. The system of claim 12, wherein the data plane is configured to operate an EVPN encapsulation/decapsulation data path configured as a Host Routed Bridging (HRB) data path comprising:
a layer two (L2) VRF table storing media access control (MAC) addresses and L2 forwarding information for one or more L2 networks associated with the one or more containerized user-level applications executing on the host computing device;
one or more L2 bridge domains (BDs), each of the L2 bridge domains corresponding to a different one of the L2 networks; and
one or more IRB interfaces that includes the IRB interface, each of the one or more IRB interfaces providing a data plane forwarding path between the layer three (L3) virtual routing and forwarding table and a different one of the one or more L2 bridge domains.

14. A method comprising:
executing, by a host computing device, a data plane of a cloud native virtual router of the host computing device;
receiving, with a secondary container network interface (CNI) executing on the host computing device, data specifying a high-level intent for an ethernet virtual private network (EVPN) encapsulation/decapsulation data path for a containerized user-level application;

translating, by the secondary CNI, the data specifying the high-level intent into configuration data for the EVPN encapsulation/decapsulation data path; and dynamically configuring, with the secondary CNI, the EVPN encapsulation/decapsulation data path in the data plane of the cloud native virtual router to provide a network connection between the containerized user-level application to be deployed and a desired bridge domain for the EVPN encapsulation/decapsulation data path, wherein the EVPN encapsulation/decapsulation data path comprises an integrated routing and bridging (IRB) interface providing bridging services for communicating L2 network traffic of the desired bridge domain via a virtual routing and forwarding (VRF) structure.

* * * * *